United States Patent [19]

Ferber

[11] Patent Number: 5,603,288

[45] Date of Patent: Feb. 18, 1997

[54] RESTRAINT DEVICE

[75] Inventor: Dennis A. Ferber, San Clemente, Calif.

[73] Assignee: Prima International LLC, City of Industry, Calif.

[21] Appl. No.: 430,975

[22] Filed: Apr. 28, 1995

[51] Int. Cl.$^6$ .............................. A01K 15/04; A01K 1/00
[52] U.S. Cl. ............................................. 119/751; 119/453
[58] Field of Search .................................. 119/452, 453, 119/459, 472, 474, 480, 751

[56] References Cited

U.S. PATENT DOCUMENTS

| | | | |
|---|---|---|---|
| 809,559 | 1/1906 | Gault | 119/453 X |
| 4,781,147 | 11/1988 | Delino, Jr. | 119/453 |
| 5,109,801 | 5/1992 | Gahagan | 119/751 |

FOREIGN PATENT DOCUMENTS

| | | | |
|---|---|---|---|
| 3524619 | 1/1987 | Germany | 119/17 |

Primary Examiner—Robert P. Swiatek
Attorney, Agent, or Firm—William P. Waters

[57] ABSTRACT

An animal restraint having two similar halves, each half having an arcuate shaped cage portion and a flat elongated base for reversible attachment thereto. Each cage portion includes generally parabolically shaped ribs of differing heights wherein the shortest rib is located at a distal end of the cage and the tallest rib is located medially. Each rib is attached, respectively, at each of its ends, to a base frame. A pair of arcuate strengthening members is attached to the base frame and, in turn to each one of the parabolic ribs. The strengthening members of one half of the cage ends medially in a sleeve for receiving its corresponding strengthening member on the other cage half, thereby reversibly joining the two cage halves. A pair of rectangular plates are reversibly held adjacent one another to form the elongated base which, in turn, is reversibly attached to the joined cage portions.

20 Claims, 3 Drawing Sheets

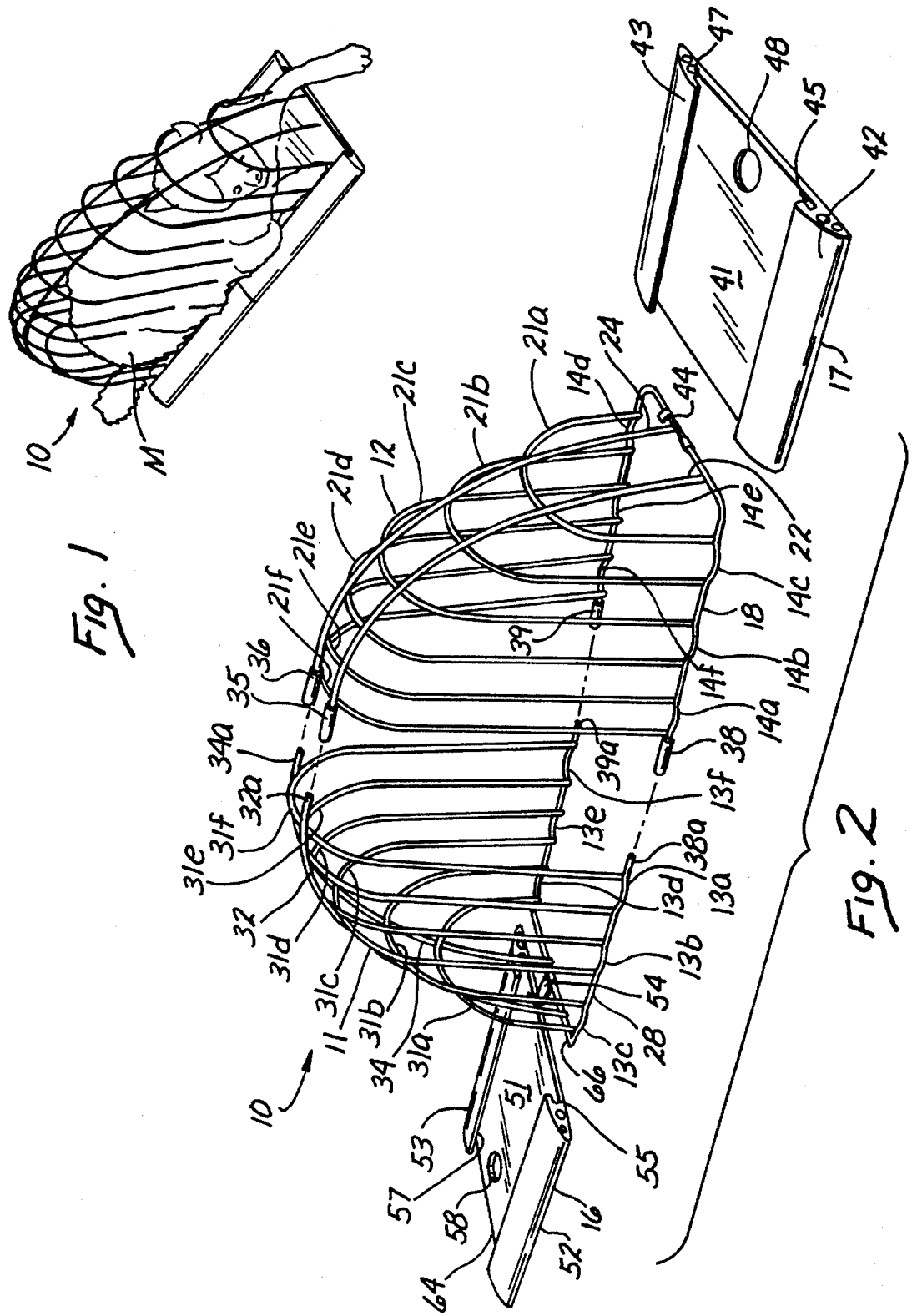

RESTRAINT DEVICE

TECHNICAL FIELD

This invention relates generally to restraint devices and, more particularly, to devices for restraining animals for washing, grooming or medicating purposes.

BACKGROUND ART

It is generally known that restraining a house pet, especially a cat, for washing, grooming or flea treatment purposes can be a difficult chore. Problems are often encountered when the pet, resisting the procedure, breaks free while wet and covered with lather. In addition, if the a cat is frightened, it may bite and claw its handler in an attempt to escape a threatening restraint.

There are several good reasons for washing and grooming a household cat. For one, generally the only effective way to de-flea a cat is to bathe the animal using medicated shampoo or dip. Failure to de-flea can result in flea infestation of the house interior and, if fleas are ingested by the cat, a tape worm malady in the cat can result. In addition, some people who react allergically in the presence of a cat are reacting, not to the animal, but to the animal's dander. Periodic washing of the cat can help correct the dander problem.

For these and other reasons, even though it is recognized that restraining a cat for washing or grooming can be a very challenging matter, pet grooming is often attempted by the owner since the alternative is a trip to a professional, such as a veterinarian, which can be expensive and inconvenient. Of course, it is not only the individual pet owner who faces this problem, pet shop proprietors and operators of animal shelters similarly have a need for a technique for washing and grooming cats in an effective and efficient manner.

Further, it is sometimes the case, when grooming or washing a cat in the absence of a suitable restraint device, two people are required, one to hold the animal and the other to perform the grooming or washing.

In view of the foregoing, it is clear that a need exists for a convenient, effective small animal restraint capable of use by a single individual.

In recognition of problems relating to animal restraint, various techniques for restraining small animals have been developed. In this regard, reference may be made to U.S. Pat. Nos. 2,539,024; 4,140,080; 4,762,085; and 4,917,047. In general, the inventions disclosed by these patents relate to small animal enclosures. However, they are not generally suitable for cases where washing or grooming is desired. Thus, while the inventions disclosed in the above mentioned patents have some utility, they are sometimes complicated, expensive and difficult to use. More importantly, while such conventional devices may be capable of restraining an animal, they are generally not readily usable when it is not restraint but washing or grooming the animal that is intended.

Another limitation of prior art restraint techniques is that some of them, while capable of effective animal restraint, accomplish such restraint in a manner as to cause the animal to fear the restraining apparatus. An example of a prior art device for restraining animals is disclosed in U.S. Pat. No. 3,094,101. Here, the animal, such as a cat, is placed in an enclosure and restrained, at least in part, when its tail is held and clamped in place.

While the invention of U.S. Pat. No. 3,094,101 may have utility for a one time inoculation of a cat, it is not likely that the cat will readily cooperate in its use a second time. This is also the case in U.S. Pat. Nos. 4,770,127 and 5,233,939 in which the inventions therein disclosed utilize one or more movable walls to squeeze the cat so it can be held for inoculation. If repeated use of such devices is attempted, it will be noted that the animal learns quickly to avoid the restraint and sometimes bites or claws the handler in order to escape. This development, of course, renders the restraint virtually useless for any subsequent use involving the threatened animal.

Another serious limitation of conventional restraints is that they generally require the animal to be restrained to enter through an opening in the restraint. This, in itself is often frightening to a cat which will frequently resist attempts to force it into the restraint. Thus, it would be very desirable to have an animal restraint which could be used without the necessity of requiring the animal to enter the restraint.

In view of the foregoing, it would be highly desirable to have a cat restraint which would securely hold the animal in a safe, comfortable and non-threatening manner. Such an invention would enable the user to employ conveniently a brush or other grooming implement. Desirably, such an invention could be used repetitively with the same animal since it would be readily acceptable to the animal and, in addition, would be usable conveniently by one person acting alone.

DISCLOSURE OF THE INVENTION

It is an object of the present invention to provide an apparatus for restraining an animal in an efficient and effective manner.

It is a further object of the present invention to provide such an apparatus having the capability for positioning an animal securely, in a comfortable and non-threatening manner and which avoids the necessity of having the animal enter the device through a door or similar opening.

It is a still further object of the present invention to provide a cat restraining apparatus which can be used repetitively with a cat without generating an adverse response on the part of the cat.

It is another object of the present invention to provide a cat restraining apparatus which is adapted for convenient use of brushes and other grooming implements during use.

It is still another object of the present invention to provide a cat restraint which can conveniently be used by a handler acting alone.

It is an even still further object of the present invention to provide an animal restraint apparatus which can be readily and conveniently disassembled for storage and yet capable of easy assembly when needed.

Briefly, the above and further objects of the present invention are realized by providing an animal restraint having two similar halves, each half having an arcuate shaped cage portion and a flat elongated base for reversible attachment thereto. Each cage portion includes generally parabolically shaped ribs of differing heights wherein the shortest rib is located at a distal end of the cage and the tallest rib is located medially. Each rib is attached, respectively, at each of its ends, to a base frame. A pair of arcuate strengthening members is attached to the base frame and, in turn to each one of the parabolic ribs. The strengthening members of one half of the cage ends medially in a sleeve for receiving its corresponding strengthening member on the other cage half, thereby reversibly joining the two cage halves. A pair of rectangular plates are reversibly held adjacent one another to form the elongated base which, in turn, is reversibly attached to the joined cage portions.

The present invention affords several advantages. For example, it does not require entry by the animal into the restraint but can, in fact be assembled around the animal in a non-threatening manner. In addition, it provides comfortable positions for the animal while minimizing the ability of the animal to move in a disruptive manner. In this regard, the joined arcuate shaped cage portions provide a smoothly shaped structure in which the cat can comfortably stand or lie down.

A principle advantage of the present invention is that its construction holds the cat in a manner which prevents it from turning its head while not causing any claustrophobic feelings in the cat.

Another advantage of the present invention is that the parabolically shaped ribs are spaced sufficiently apart as to allow access to the animal with a brush or other grooming instrument.

A further advantage of the present invention is that it can be utilized conveniently by a single individual without the assistance of another.

A still further advantage of the present invention is that, by virtue of a secure means of attachment of the base and the cage portions, the restraint can be used for transporting small animals, in addition to providing a grooming capability.

A still further advantage of the present invention is that it is readily assembled for use and conveniently disassembled for storage.

A still further advantage of the present invention is that it is constructed of readily available material and it is inexpensive to manufacture.

BRIEF DESCRIPTION OF DRAWINGS

The above mentioned and other objects and features of this invention and the manner of attaining them will become apparent and the invention itself will be best understood by reference to the following description of the embodiment of the invention in conjunction with the accompanying drawings, wherein:

FIG. 1 is a perspective view of the restraint device of the present invention;

FIG. 2 is an exploded view of the restraint device of FIG. 1;

BEST MODE FOR CARRYING OUT THE INVENTION

Figure 3:
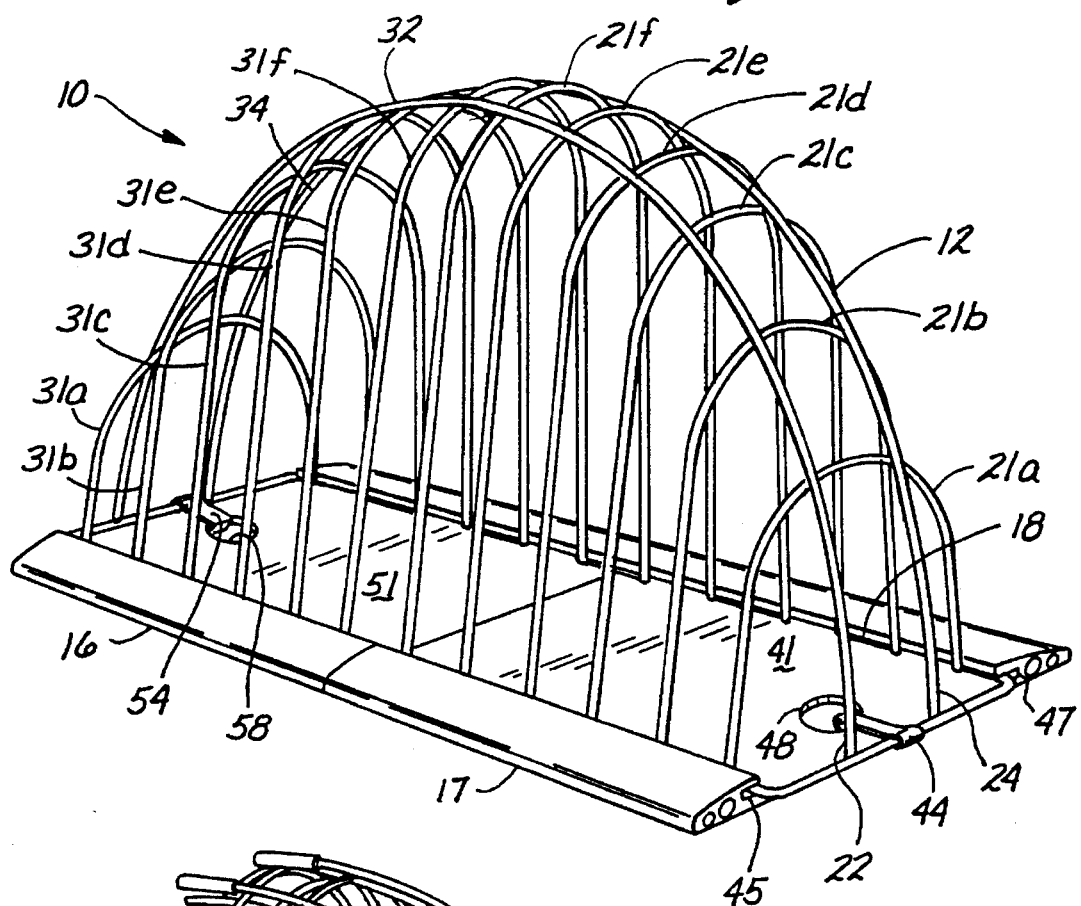
FIG. 3 is a perspective view of a restraint device of the present invention which is similar to the device of FIGS. 1 and 2 but having a hinged base and another means for cage portion attachment.

Referring now to the drawings and more particularly to FIGS. 1–3 thereof, there is depicted a novel animal restraint 10 which is constructed according to the present invention and which is adapted for restraining a cat M comfortably and effectively for washing and grooming purposes.

The restraint 10 is comprised generally of a pair of cage like elements 11 and 12 and a pair of like rectangular base plates 16 and 17.

The cage element 12 is comprised of a plurality of generally parabolically shaped ribs, such as the ribs 21a through 21f, each of which is attached at its ends, in spaced apart relationship, to a frame 18. In addition to their attachment to the frame 18, the ribs are held in place by arcuate shaped strengthening members 22 and 24, each one of which is attached at one end to the frame 18 and to each of the ribs 21a–21f. Projecting laterally from the base 18 is a plurality of spaced apart protrusions, such as the protrusions 14a through 14f. As will be discussed below, the protrusions are utilized to attach the cage element 12 to the plate 17.

The ribs 21a–21f, the strengthening members 22 and 24, the frame 18 and the protrusions 14a–14f are each constructed of plastic covered steel wire having approximately a one eighth inch diameter. The ribs are spaced apart one from the other at a distance of approximately 1¾ inches. This spacing provides ready access to the restrained cat M by a brush or other grooming implement while effectively restraining the cat. At the same time, it provides a comfortable and open environment for it.

The cage portion 11 has a construction similar to that of the cage portion 12. It has a plurality of generally parabolically shaped ribs 31a through 31f, a pair of arcuate shaped strengthening members 32 and 34 and a frame 28 having protrusions 13a through 13f.

During assembly of the restraint 10, the cage members 11 and 12 are reversibly joined at sleeves 35 and 36 disposed, respectively, on the medial ends of the strengthening members 22 and 24. The sleeves 35 and 36 engage medially projecting ends of the corresponding strengthening members 32a and 34a, respectively, of the cage element 11. In addition, the frame 18 includes a pair of sleeves 38 and 39 for reversible engagement, respectively, with medially projecting portions 38a and 39a on the frame 28.

The base plates 16 and 17 are identical. Each is generally rectangular in shape and constructed of hardened plastic material. The base plate 17 has a floor portion 41 and a pair of opposite sidewalls 42 and 43. The sidewalls 42 and 43 each overlap the floor 41 to define grooves 45 and 47, respectively. An aperture 48 is formed in the floor 41 for receipt of a latch 44 during assembly of the restraint 10. It will be appreciated that the latch 44 helps to prevent unwanted separation of the plates 16 and 17 when the restraint 10 is in use.

As noted, the base plate 16 is identical in construction to the base plate 17 having a floor 51 containing an aperture 58 for engagement of a latch 54 on the cage element 11. Sidewalls 52 and 53 help define grooves 55 and 57, respectively.

In use, the cage elements 11 and 12 are joined at the aforementioned sleeves and the assembled cage is placed over the cat M. The plate 16 is slid along the frame 28 so that the protrusions 13a–13f slidedly engage the grooves 55 and 57. The plate 16 is slid medially along the frame 28 until a rear edge 64 is approximately flush with a rear portion 66 of the frame 28. At this point, the plate 16 is under the cat M. The latch 54 is then rotated into place to extend through the aperture 58 for preventing unwanted movement of the plate 16.

In a similar manner, the plate 17 is slid under the cat M until the latch 44 similarly engages the plate 17 at the aperture 48.

Figure 5:
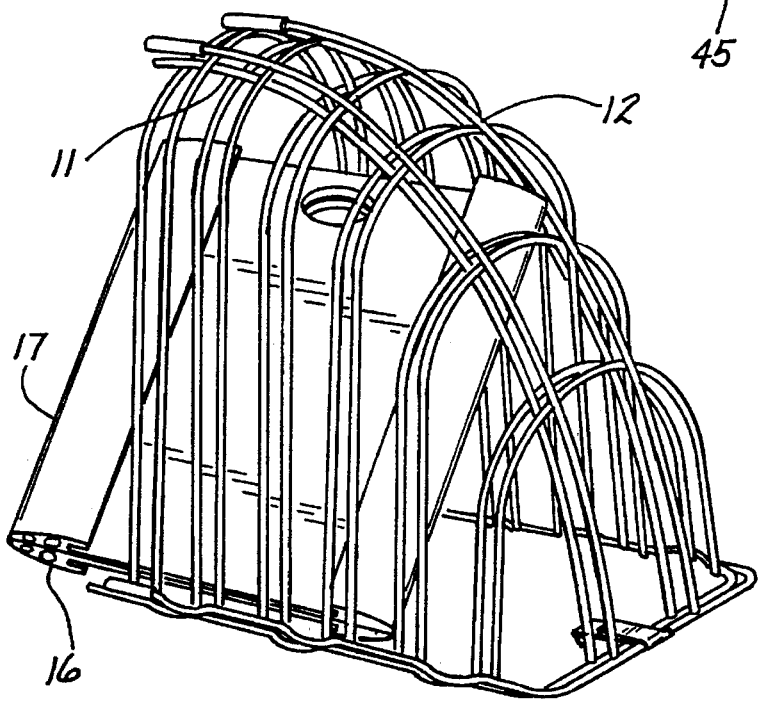
FIG. 5 is a perspective view of the restraint device of the present invention showing the components thereof in a storage configuration.
Figure 4:
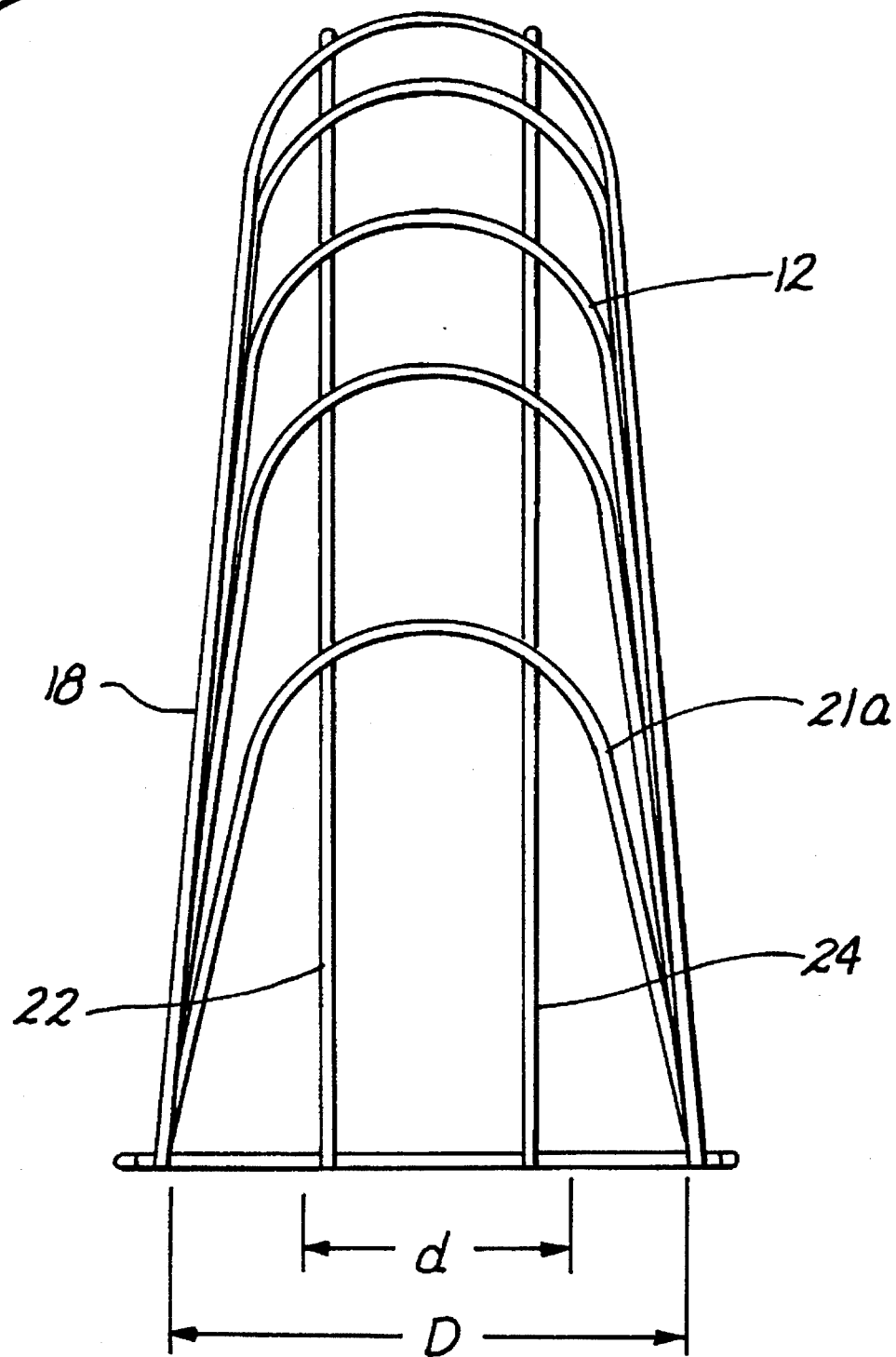
FIG. 4 is an end view of one of the cage elements of the restraint device of the present invention.

Referring now to FIG. 4., there is shown an end view of the cage element 12. It will be noted that each of the ribs 21a–21f, as for example the rib 21a, has a width D, where it attaches to the frame 18, of abut 5 inches. The width of the rib smoothly decreases until a width d of abut 4 inches is realized. In this manner, the wide bottom of the restraint 10 readily accommodates the body of the cat M. When the cat stands, the narrower upper portion of the restraint comfortably accommodates the cat's head and shoulders best because of the narrower dimension d, the cat is restrained from moving its head. This factor tends to calm the animal and make it more tractable for washing and grooming With reference now to FIG. 5, the construction of the restraint 10 permits easy disassembly for storage. As shown, the cage element 11 can be nested in the cage element 12 while the plates 16 and 17 can be stored within the nested cage elements. Thus, a compact unit for storage is provided.

It will be recognized by one skilled in the art of animal restraints that modifications to some of the elements of the present invention made be made while adhering to the spirit of the invention. For example, a single elongated plate, or a hinged plate, could be used in place of the plates 16 and 17. Also the cage elements 11 and 12 may be attached to the plate by clips or by other, conventional techniques.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An apparatus for restraining an animal comprising:

an elongated plate for supporting a restrained animal;

an elongated cage member, said cage member including a plurality of rib members, each one of said plurality of rib members having one end fixed adjacent one of the sides of said elongated cage member and having another end fixed adjacent the opposite side of said elongated cage member, said plurality of rib members including tall members, short members, and members having a height intermediate between that of said tall members and that of said short members, said rib members being fixed to said elongated cage member in spaced apart relationship so that the tall members are fixed adjacent the middle of said elongated cage member, the short members are fixed adjacent the ends of said elongated cage member, and the intermediate height members are fixed between the tall members and the short members; and means for attaching said elongated cage member to said elongated plate for restraining an animal supported by said plate.

2. An apparatus according to claim 1, wherein said elongated plate includes a pair of side walls, each one of said side walls and said elongated plate defining an elongated groove for frictional engagement of said means for attaching said elongated cage member to said elongated plate.

3. An apparatus according to claim 2, wherein said elongated cage member includes laterally projecting attachment means for frictional engagement, in said elongated groove, with said side walls and said elongated plate.

4. An apparatus according to claim 1, wherein said at least one elongated cage member includes at least one radial strengthening member, said strengthening member being attached at each end of said elongated cage member and being attached, also, to each one of said plurality of rib members.

5. An apparatus according to claim 1, wherein said elongated cage member and each of said plurality of rib members are constructed of wire.

6. An apparatus according to claim 1, wherein said elongated cage member and each of said plurality of rib members are constructed of plastic.

7. An apparatus according to claim 1, wherein said elongated plate includes a hook receiving aperture and said means for attaching includes hook means for engagement of said elongated plate through said aperture, said hook means being attached to said cage member.

8. An apparatus for restraining an animal comprising:

a plurality of elongated plates for supporting a restrained animal;

means for attaching each of said plurality of elongated plates one to the other in an end to end relationship;

an elongated cage member, said cage member including a plurality of rib members, each one of said plurality of rib members having one end fixed adjacent one of the sides of said elongated cage member and having another end fixed adjacent the opposite side of said elongated cage member, said plurality of rib members including tall members, short members, and members having a height intermediate between that of said tall members and that of said short members, said rib members being fixed to said elongated cage member in spaced apart relationship so that the tall members are fixed adjacent the middle of said elongated cage member, the short members are fixed adjacent the ends of said elongated cage member, and the intermediate height members are fixed between the tall members and the short members; and means for attaching said elongated cage member to said attached elongated plates for restraining an animal supported by said attached elongated plates.

9. An apparatus according to claim 8, wherein each one of said elongated plates includes a pair of side walls, each one of said side walls and each one of said elongated plates defining, respectively, an elongated groove for frictional engagement of said means for attaching said elongated cage member to said attached elongated plates.

10. An apparatus according to claim 9, wherein said elongated cage member includes laterally projecting attachment means for frictional engagement, in said respective elongated grooves, with said side walls and said attached elongated plates.

11. An apparatus according to claim 8, wherein said at least one elongated cage member includes at least one radial strengthening member, said strengthening member being attached at each end of said elongated cage member and being attached, also, to each one of said plurality of rib members.

12. An apparatus according to claim 8, wherein said elongated cage member and each of said plurality of rib members are constructed of wire.

13. An apparatus according to claim 8, wherein said elongated cage member and each of said plurality of rib members are constructed of plastic.

14. An apparatus according to claim 8, wherein at least one of said elongated plates includes a hook receiving aperture and said means for attaching includes hook means for engagement of said at least one elongated plate through said aperture, said hook means being attached to said cage member.

15. An apparatus for restraining an animal comprising:

a plurality of elongated plates for supporting a restrained animal;

means for attaching each of said plurality of elongated plates one to the other in an end to end relationship;

a plurality of elongated cage members, each one of said cage members including, respectively, a plurality of rib members, each one of said respective plurality of rib members having one end fixed adjacent one of the sides of its respective elongated cage member and having another end fixed adjacent the opposite side of said elongated cage member, each of said respective plurality of rib members including tall members, short members, and members having a height intermediate between that of said tall members and that of said short members, said rib members being fixed to said elongated cage member in spaced apart relationship so that the tall members are fixed adjacent one end of said elongated cage member, the short members are fixed adjacent the opposite end of said elongated cage member, and the intermediate height members are fixed between the tall members and the short members;

means for attaching one of said elongated cage members to another one of said elongated cage members so that a tall member of the one of said elongated cage members is in proximity with a tall member of the another one of said elongated members; and means for attaching said attached elongated cage members to said attached elongated plates for restraining an animal supported by said attached elongated plates.

16. An apparatus according to claim 15, wherein each one of said elongated plates includes a pair of side walls, each one of said side walls and each one of said elongated plates defining, respectively, an elongated groove for frictional engagement of said means for attaching at least one of said plurality of elongated cage members to said attached elongated plates.

17. An apparatus according to claim 16, wherein at least one of said plurality of elongated cage members includes laterally projecting attachment means for frictional engagement, in said respective elongated grooves, with said side walls and said attached elongated plates.

18. An apparatus according to claim 15, wherein each of said elongated cage members includes at least one radial strengthening member, said at least one strengthening member being attached at each end of said elongated cage member and being attached, also, to each one of said plurality of rib members.

19. An apparatus according to claim 15, wherein at least one of said elongated plates includes a hook receiving aperture and said means for attaching includes hook means for engagement of said at least one elongated plate through said aperture, said hook means being attached to said cage member.

20. An apparatus according to claim 15, wherein said means for attaching one of said plurality of cage members to another one of said plurality of cage members includes projection means located on the one of said plurality of cage members and sleeve means for receiving said projection means, said sleeve means being located on the another one of said plurality of cage members.

* * * * *